United States Patent
Khaja et al.

(10) Patent No.: US 11,993,173 B2
(45) Date of Patent: May 28, 2024

(54) ADVANCED STORAGE BATTERY SHIPPING FEATURE

(71) Applicants: Basil M Khaja, Waterford, MI (US); Joseph B Adams, Northville, MI (US); David R Pedro, Tecumseh (CA); Rohit V Koli, Shelby Township, MI (US); Leo Bauer, Novi, MI (US)

(72) Inventors: Basil M Khaja, Waterford, MI (US); Joseph B Adams, Northville, MI (US); David R Pedro, Tecumseh (CA); Rohit V Koli, Shelby Township, MI (US); Leo Bauer, Novi, MI (US)

(73) Assignee: FCA US LLC, Auburn Hills, MI (US)

(*) Notice: Subject to any disclaimer, the term of this patent is extended or adjusted under 35 U.S.C. 154(b) by 409 days.

(21) Appl. No.: 17/363,385

(22) Filed: Jun. 30, 2021

(65) Prior Publication Data

US 2023/0001821 A1    Jan. 5, 2023

(51) Int. Cl.
| | |
|---|---|
| *B60L 58/12* | (2019.01) |
| *H01M 10/44* | (2006.01) |
| *H01M 10/48* | (2006.01) |
| *H02J 7/00* | (2006.01) |

(52) U.S. Cl.
CPC ............. *B60L 58/12* (2019.02); *H01M 10/44* (2013.01); *H01M 10/48* (2013.01); *H02J 7/0048* (2020.01); *B60L 2240/547* (2013.01); *H01M 2220/20* (2013.01)

(58) Field of Classification Search
CPC .. B60L 58/12; B60L 2240/547; H02J 7/0048; H01M 10/44; H01M 10/48; H01M 2220/20; H01M 2240/547

USPC .................................................. 320/109, 149
See application file for complete search history.

(56) References Cited

U.S. PATENT DOCUMENTS

| | | | |
|---|---|---|---|
| 8,970,173 B2 | 3/2015 | Kelty et al. | |
| 9,041,357 B2 | 5/2015 | Cao et al. | |
| 2009/0111006 A1 | 4/2009 | Bruce et al. | |
| 2010/0109765 A1 | 5/2010 | Esnard et al. | |
| 2015/0084409 A1 | 3/2015 | Song | |

(Continued)

FOREIGN PATENT DOCUMENTS

| | | | |
|---|---|---|---|
| CN | 112455286 | * | 3/2021 |
| DE | 102019125904 | * | 4/2021 |

OTHER PUBLICATIONS

Machine Translation of CN 112455286, 15 pages (Year: 2021).*
Machine Translation of DE 102019125904, 9 pages (Year: 2021).*

*Primary Examiner* — Nathaniel R Pelton
(74) *Attorney, Agent, or Firm* — Jeremy J. Klobucar

(57) ABSTRACT

Battery management techniques for a vehicle include a set of sensors configured to measure a set of parameters of a battery of the vehicle and a controller configured to control recharging of the battery to a first target state of charge (SOC) corresponding to optimized battery life when a mileage of the vehicle is less than a threshold mileage corresponding to an expected transport period of the vehicle, wherein controlling the recharging of the battery to the first target SOC prevents battery malfunctions and thereby reduces vehicle warranty costs for an original equipment manufacturer (OEM) of the vehicle, and control recharging of the battery to a second target SOC determined by a cost-based optimization technique when the mileage of the vehicle reaches the threshold mileage.

14 Claims, 2 Drawing Sheets

(56) References Cited

U.S. PATENT DOCUMENTS

2021/0370797 A1\* 12/2021 Brumley, Jr. ....... H01M 10/441
2022/0234459 A1\* 7/2022 Auberger ................ B60L 53/66

\* cited by examiner

ADVANCED STORAGE BATTERY SHIPPING FEATURE

FIELD

The present application generally relates to vehicle battery management and, more particularly, to an advanced storage battery shipping feature.

BACKGROUND

In today's vehicles, a large number of vehicle batteries are replaced under warranty during vehicle transport and before customer delivery, which increases costs for the original equipment manufacturer (OEM). This is primarily due to the batteries never being fully charged (e.g., 30-50% when leaving the plant) and the vehicles being periodically operated (e.g., on/off loading the vehicles to/from shipping trucks, lights being inadvertently left on, etc.). Typically, during vehicle shipment from the plant, the batteries are not fully charged because this could be detrimental to battery performance and life. Conventional battery management systems and methods attempt to solve this problem by minimizing ignition-off draw (IOD) current during a "shipping mode" while the vehicles are in transport, but this does not fully solve the above-described problem. Accordingly, while such battery management systems and methods do work for their intended purpose, there exists an opportunity for improvement in the relevant art.

SUMMARY

According to one example aspect of the invention, a battery management system for a vehicle is presented. In one exemplary implementation, the system comprises a set of sensors configured to measure a set of parameters of a battery of the vehicle and a controller configured to control recharging of the battery to a first target state of charge (SOC) corresponding to optimized battery life when a mileage of the vehicle is less than a threshold mileage corresponding to an expected transport period of the vehicle, wherein controlling the recharging of the battery to the first target SOC prevents battery malfunctions and thereby reduces vehicle warranty costs for an original equipment manufacturer (OEM) of the vehicle, and control recharging of the battery to a second target SOC determined by a cost-based optimization technique when the mileage of the vehicle reaches the threshold mileage.

In some implementations, the battery is a lithium ion (Li-ion) battery having the set of sensors integrated therein. In some implementations, the first target SOC is 85-90%. In some implementations, the Li-ion battery has a Lithium Iron Phosphate (LFP) composition, which provides for a higher first target SOC compared to an absorbent glass mat (AGM) battery. In some implementations, the battery is an AGM battery, and one of the set of sensors is a voltage sensor integrated in the AGM battery. In some implementations, the first target SOC is 80-85%. In some implementations, the threshold mileage is 50 miles.

According to another example aspect of the invention, a battery management method for a vehicle is presented. In one exemplary implementation, the method comprises measuring, by a set of sensors, a set of parameters of a battery of the vehicle, controlling, by a controller, recharging of the battery to a first target SOC corresponding to optimized battery life when a mileage of the vehicle is less than a threshold mileage corresponding to an expected transport period of the vehicle, wherein controlling the recharging of the battery to the first target SOC prevents battery malfunctions and thereby reduces vehicle warranty costs for an OEM of the vehicle, and controlling, by the controller, recharging of the battery to a second target SOC determined by a cost-based optimization technique when the mileage of the vehicle reaches the threshold mileage.

In some implementations, the battery is a Li-ion battery having the set of sensors integrated therein. In some implementations, the first target SOC is 85-90%. In some implementations, the Li-ion battery has a LFP composition, which provides for a higher first target SOC compared to an AGM battery. In some implementations, the battery is an AGM battery, and one of the set of sensors is a voltage sensor integrated in the AGM battery. In some implementations, the first target SOC is 80-85%. In some implementations, the threshold mileage is 50 miles.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously mentioned, a large number of vehicle batteries are replaced under warranty during vehicle transport and before customer delivery, which increases costs for the original equipment manufacturer (OEM). This is primarily due to the batteries never being fully charged (e.g., 30-50% when leaving the plant) and the vehicles being periodically operated (e.g., on/off loading the vehicles to/from shipping trucks, lights being inadvertently left on, etc.). Typically, during vehicle shipment from the plant, the batteries are not fully charged because this could be detrimental to battery performance and life. Conventional battery management systems and methods attempt to solve this problem by minimizing ignition-off draw (IOD) current during a "shipping mode" while the vehicles are in transport, but this does not fully solve the above-described problem.

Accordingly, improved battery management systems and methods are presented herein. These techniques maintain the battery charge at a desired level (e.g., 80-90%) until a threshold number of miles have been driven, after which a cost-based battery charge technique would be utilized. This higher level of charge, but less than full charge, provides for safe storage and maximized/optimized battery life. The primary type of battery utilized in vehicles is absorbent glass mat (AGM) batteries. However, there is also a newer type of advanced storage lithium ion (Li-Ion) battery for vehicle applications that has intelligent sensors built-in. These techniques are applicable to both Li-Ion batteries through the use of the built-in intelligent sensors, but are also applicable to AGM batteries, which include a less intelligent voltage sensor and would have a slightly different target charge level (e.g., 80-85%). The potential benefits of these techniques include reduced battery malfunctions and thereby reduced warranty costs for the OEM.

Figure 1:
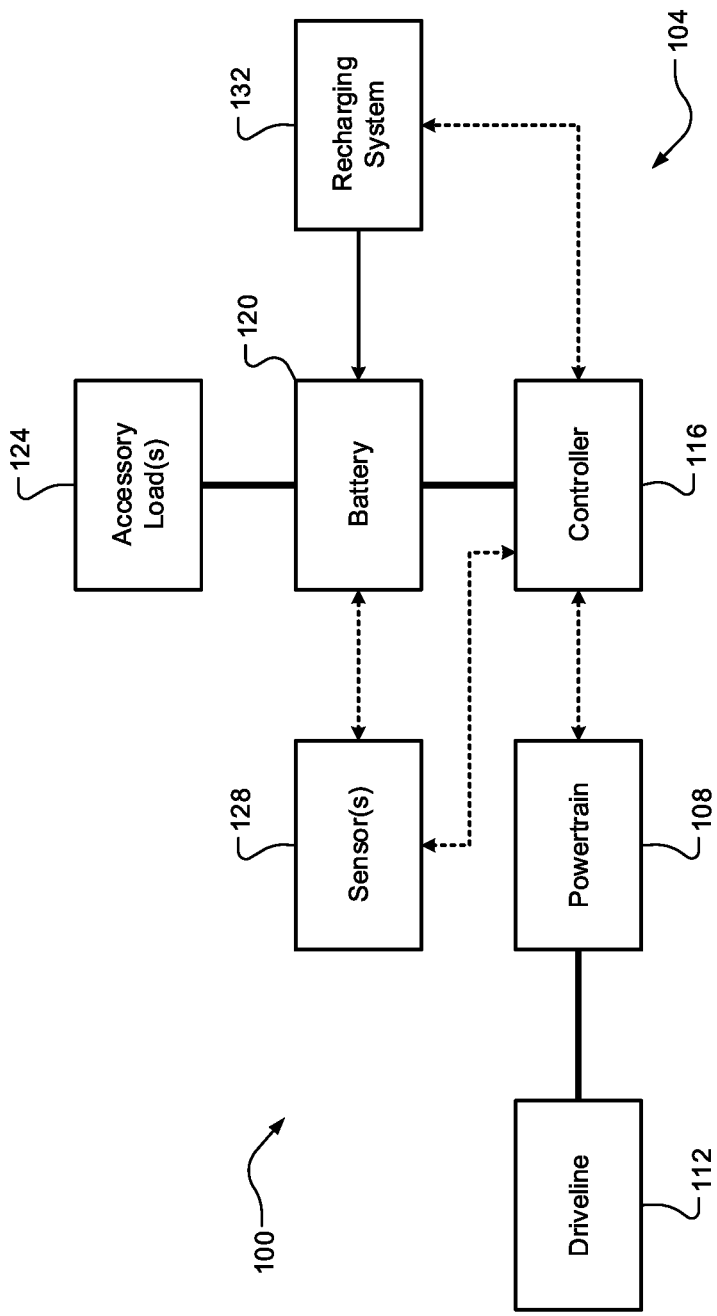
FIG. 1 is a functional block diagram of a vehicle having an example battery management system according to the principles of the present application.

Referring now to FIG. 1, a functional block diagram of a vehicle 100 having an example battery management system 104 according to the principles of the present application is illustrated. The vehicle 100 generally comprises a powertrain 108 (e.g., an engine, an electric motor, or a combination thereof) configured to generate and transfer drive torque to a driveline 112 for vehicle propulsion. The vehicle 100 also comprises a controller 116 configured to control operation of the vehicle 100, including primarily controlling the powertrain 108 to generate a desired amount of drive torque based on a driver input (e.g., via an accelerator pedal (not shown)). The vehicle 100 further comprises a battery 120, a set of accessory loads 124 powered by the battery 120. The battery management system 104 comprises the controller 116, a set of sensors 128 configured to measure a set of parameters (voltage, current, SOC, etc.) of the battery 120, and a recharging system 132 (an alternator, a DC-DC converter, etc.) for recharging the battery 120.

As previously mentioned, the techniques of the present application are applicable to both advanced storage Li-ion (hereinafter, li-ion) and AGM implementations for the battery 120. In a Li-ion implementation for the battery 120, many or all of the set of sensors 128 are integrated into the battery 120. In one exemplary Li-ion implementation for the battery 120, the composition of the Li-ion cells of the battery is Lithium Iron Phosphate (LFP) composition and the set of sensors 128 integrated into the battery include a voltage sensor, a current sensor, and an SOC sensor, in addition to a set of relays that can be controlled to move charge throughout different Li-ion cells of the battery 120.

This LFP composition in addition to the integrated set of sensors 128 allows for this Li-ion implementation to be safely charged and stored at higher SOC levels compared to other traditional batteries (e.g., Li-ion consumer electronic batteries) as well as the above-described AGM implementation. For example only, the Li-ion implementation could have a target SOC of 85-90%, whereas the AGM implementation could have a target SOC of 80-85%. In the AGM implementation if the battery 120, there is also less integrated intelligence.

In one exemplary AGM implementation, the battery 120 only comprises a voltage sensor of the set of sensors 128 integrated within the AGM. Other sensors of the set of sensors 128 could be external sensors to the battery 120, which could increase costs, or the battery management technique could only monitor the voltage of the AGM implementation of the battery 120, which would be less precise and thus the lower target SOC (or voltage level) would be utilized to avoid excessive charging that could result in a malfunction.

Figure 2:
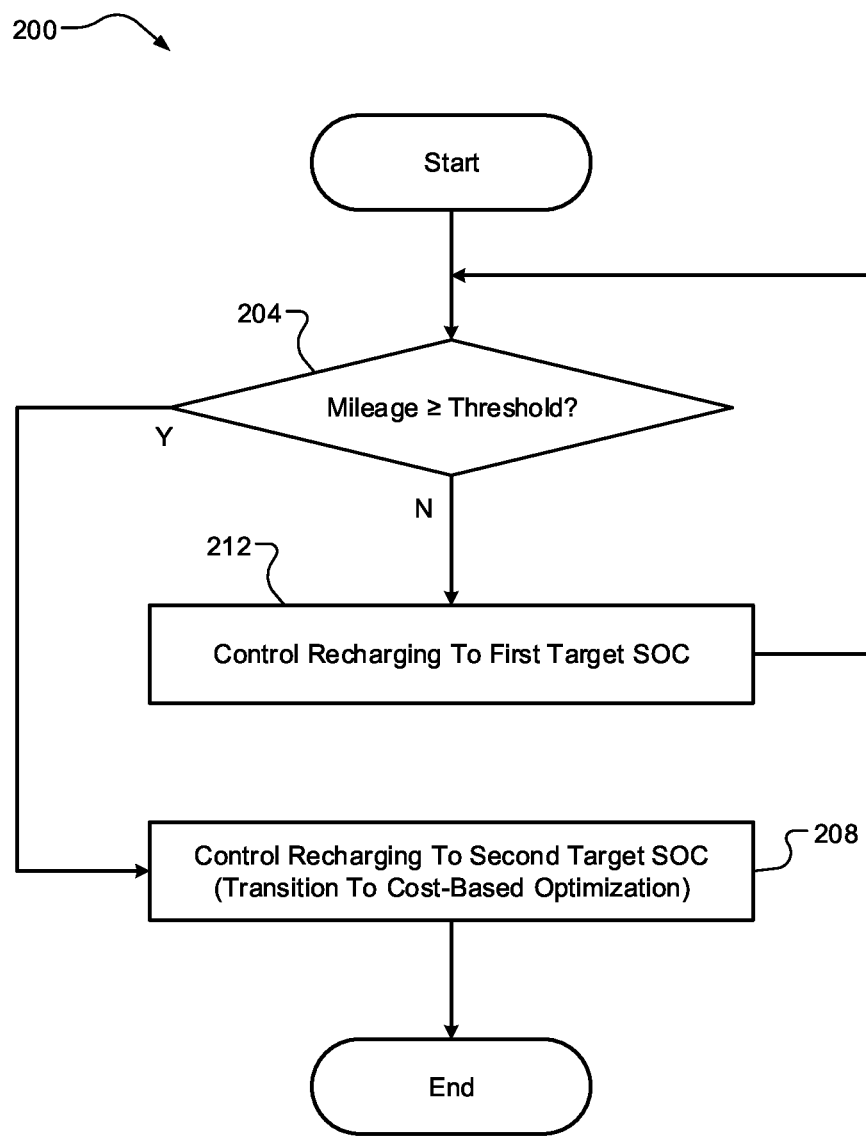
FIG. 2 is a flow diagram of an example battery management method for a vehicle according to the principles of the present application.

Referring now to FIG. 2, a flow diagram of an example battery management method 200 according to the principles of the present application is illustrated. While the method 200 is described with specific reference to the vehicle 100 and its components (e.g., the battery management system 104), it will be appreciated that this method 200 could be applicable to any suitable vehicle battery management application. At 204, the controller 116 determines whether the vehicle's mileage has reached a threshold mileage. When false, the method 200 proceeds to 212. This threshold mileage is calibratable and should be sufficiently high to anticipate a majority of vehicle transportation scenarios (e.g., worst-case vehicle transport scenarios). For example only, the threshold mileage could be 50 miles. Setting the threshold mileage higher will not have a significant negative effect on vehicle fuel economy compared to a cost-based optimization technique that will be in effect at 208 after this threshold mileage is reached. This cost-based optimization technique will take into account a plurality of other operating parameters in order to optimally control battery recharging to a second target SOC for optimal vehicle efficiency/fuel economy as desired by the customer.

This second target SOC will likely be less than the first target SOC, but it will be appreciated that there could be conditions where the cost-based optimization technique could generate the second target SOC to similar levels as the first target SOC. At 212, the controller 116 controls recharging of the battery 120 to a first target SOC for optimal battery life and storage during vehicle transport. This could include, for example only, periodically waking up the vehicle 100 to perform trickle recharging of the battery 120 to the first target SOC. The method 200 then returns to 204 to determine whether the mileage threshold has been reached. This process will continue until the threshold mileage is finally reached at 204 and the cost-based optimization technique can fully takeover.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery management system for a vehicle, the system comprising:
   a set of sensors configured to measure a set of parameters of a battery of the vehicle; and
   a controller configured to:
   initiate a shipping mode of the vehicle during which the vehicle is expected to be in transport to a destination; and
   during the shipping mode of the vehicle, control recharging of the battery to a first target state of charge (SOC) corresponding to optimized battery life when a mileage of the vehicle is less than a threshold mileage corresponding to the shipping mode, wherein controlling the recharging of the battery to the first target SOC prevents battery malfunctions and thereby reduces vehicle warranty costs for an original equipment manufacturer (OEM) of the vehicle;
   end the shipping mode of the vehicle when the vehicle mileage reaches the threshold mileage; and control recharging of the battery to a second target SOC determined by a cost-based optimization technique when the vehicle is no longer in the shipping mode.

2. The system of claim 1, wherein the battery is a lithium ion (Li-ion) battery having the set of sensors integrated therein.

3. The system of claim 2, wherein the first target SOC is 85-90%.

4. The system of claim 2, wherein the Li-ion battery has a Lithium Iron Phosphate (LFP) composition, which provides for a higher first target SOC compared to an absorbent glass mat (AGM) battery.

5. The system of claim 1, wherein the battery is an absorbent glass mat (AGM) battery, and one of the set of sensors is a voltage sensor integrated in the AGM battery.

6. The system of claim 5, wherein the first target SOC is 80-85%.

7. The system of claim 1, wherein the threshold mileage is 50 miles.

8. A battery management method for a vehicle, the method comprising:
 measuring, by a set of sensors, a set of parameters of a battery of the vehicle;
 initiating, by a controller of the vehicle, a shipping mode of the vehicle during which the vehicle is expected to be in transport to a destination;
 during the shipping mode of the vehicle, controlling, by the controller, recharging of the battery to a first target state of charge (SOC) corresponding to optimized battery life when a mileage of the vehicle is less than a threshold mileage corresponding to the shipping mode, wherein controlling the recharging of the battery to the first target SOC prevents battery malfunctions and thereby reduces vehicle warranty costs for an original equipment manufacturer (OEM) of the vehicle;
 end the shipping mode of the vehicle when the vehicle mileage reaches the threshold mileage; and
 controlling, by the controller, recharging of the battery to a second target SOC determined by a cost-based optimization technique when the vehicle is no longer in the shipping mode.

9. The method of claim 8, wherein the battery is a lithium ion (Li-ion) battery having the set of sensors integrated therein.

10. The method of claim 9, wherein the first target SOC is 85-90%.

11. The method of claim 9, wherein the Li-ion battery has a Lithium Iron Phosphate (LFP) composition, which provides for a higher first target SOC compared to an absorbent glass mat (AGM) battery.

12. The method of claim 8, wherein the battery is an absorbent glass mat (AGM) battery, and one of the set of sensors is a voltage sensor integrated in the AGM battery.

13. The method of claim 12, wherein the first target SOC is 80-85%.

14. The method of claim 8, wherein the threshold mileage is 50 miles.

* * * * *